United States Patent
Kärkäs et al.

(10) Patent No.: US 7,738,409 B2
(45) Date of Patent: *Jun. 15, 2010

(54) SYSTEM AND METHOD FOR WIRELESS COMMUNICATIONS

(75) Inventors: Pasi A. Kärkäs, Espoo (FI); Jyrki Alamaunu, Espoo (FI); Juha Tomberg, Turku (FI)

(73) Assignee: Nokia Corporation, Espoo (FI)

( * ) Notice: Subject to any disclaimer, the term of this patent is extended or adjusted under 35 U.S.C. 154(b) by 1462 days.

This patent is subject to a terminal disclaimer.

(21) Appl. No.: 11/105,896

(22) Filed: Apr. 13, 2005

(65) Prior Publication Data

US 2006/0252404 A1    Nov. 9, 2006

(51) Int. Cl.
*H04B 7/00* (2006.01)

(52) U.S. Cl. ............... 370/310; 455/422.1; 455/67.13; 455/63.1; 455/522; 370/311; 370/468; 370/473; 370/474

(58) Field of Classification Search ............. 455/422.1, 455/522, 63.1, 67.13; 370/310, 311, 468, 370/473, 474
See application file for complete search history.

(56) References Cited

U.S. PATENT DOCUMENTS

2003/0152107 A1    8/2003  Pekonen

OTHER PUBLICATIONS

Kiyoshi Kobayashi, Member IEEE, et al., Low Power and High-Quality Signal Transmission Baseband LSIC for Personal Communications, IEEE Transactions on Very Large Scale Integration (VLSI) Systems, vol. 6, No. 4, Dec. 1988, pp. 687-696.
EN301192, Digital Video Broadcasting (DVB); DVB specification for data broadcasting (ETSI), Jun. 2004.
ISO/IEC International Standard 13818-6 MPEG-2 Digital Storage Media Command & Control (ISO/IEC), Sep. 1998.
ISO/IEC International Standard 13818-1 Generic Coding of Motion Pictures and Associated Audio: Systems (ISO/IEC), Dec. 2000.
EN300744, Digital Video Broadcasting (DVB); Framing structure, channel coding and modulation for digital terrestrial television (ETSI), Jan. 2001.

*Primary Examiner*—Stephen M D'Agosta
(74) *Attorney, Agent, or Firm*—Locke Lord Bissell & Liddell LLP

(57) ABSTRACT

Systems and methods applicable, for instance, in wireless communications. For example, a mobile node and/or other computer receiving a time slice burst of an elementary stream may act to obtain a delta-t time value specifying time to elapse until a subsequent burst, and/or may act to obtain information corresponding to burst length. As another example, the mobile node and/or other computer may set in view of the delta-t time value an alarm elapsed time value for activating reception circuitry. As yet another example, the mobile node and/or other computer may set in view of the information corresponding to burst length an alarm elapsed time value for deactivating reception circuitry.

30 Claims, 6 Drawing Sheets

SYSTEM AND METHOD FOR WIRELESS COMMUNICATIONS

FIELD OF INVENTION

This invention relates to systems and methods for wireless communications.

BACKGROUND INFORMATION

In recent times, there has been an increase in the use of wireless communications. For example, many users have come to consider wireless communications (e.g., Terrestrial Digital Video Broadcast (DVB-T) or Digital Video Broadcasting: Handhelds (DVB-H)) to be a preferred source of news, entertainment, information, and the like.

Accordingly, there may be interest in technologies that, for example, facilitate wireless communications.

SUMMARY OF THE INVENTION

According to embodiments of the present invention there are provided systems and methods applicable, for instance, in wireless communications.

For example, in various embodiments a mobile node and/or other computer receiving a time slice burst of an elementary stream may act to obtain a delta-t time value specifying time to elapse until a subsequent burst, and/or may act to obtain information corresponding to burst length. As another example, in various embodiments the mobile node and/or other computer may set in view of the delta-t time value an alarm elapsed time value for activating reception circuitry. Moreover, in various embodiments the mobile node and/or other computer may set in view of the information corresponding to burst length an alarm elapsed time value for deactivating reception circuitry.

DETAILED DESCRIPTION OF THE INVENTION

General Operation

According to embodiments of the present invention there are provided systems and methods applicable, for instance, in wireless communications.

For example, in various embodiments a mobile node and/or other computer receiving a time slice burst of an elementary stream may act to extract a delta-t time value. The delta-t time value might, for instance, specify time to elapse until a subsequent time slice burst of the elementary stream. As another example, in various embodiments the mobile node and/or other computer may act to obtain information corresponding to burst length.

The mobile node and/or other computer might, in various embodiments, act to set one or more alarm elapsed time values for a timer. The mobile node and/or other computer might, for example, act to activate reception circuitry upon such an alarm elapsed time value being met. As another example, the mobile node and/or other computer might act to deactivate reception circuitry upon another such alarm elapsed time value being met. The alarm elapsed time value for activating reception circuitry might, for instance, bet set in view of the delta-t time value. The alarm elapsed time value for deactivating reception circuitry might, for instance, bet set in view of the information corresponding to burst length.

Via such functionality the mobile node and/or other computer might, for instance, come to enjoy power savings.

Various aspects of the present invention will now be discussed in greater detail.

Delta-t Time Value Extraction Operations

Figure 1:
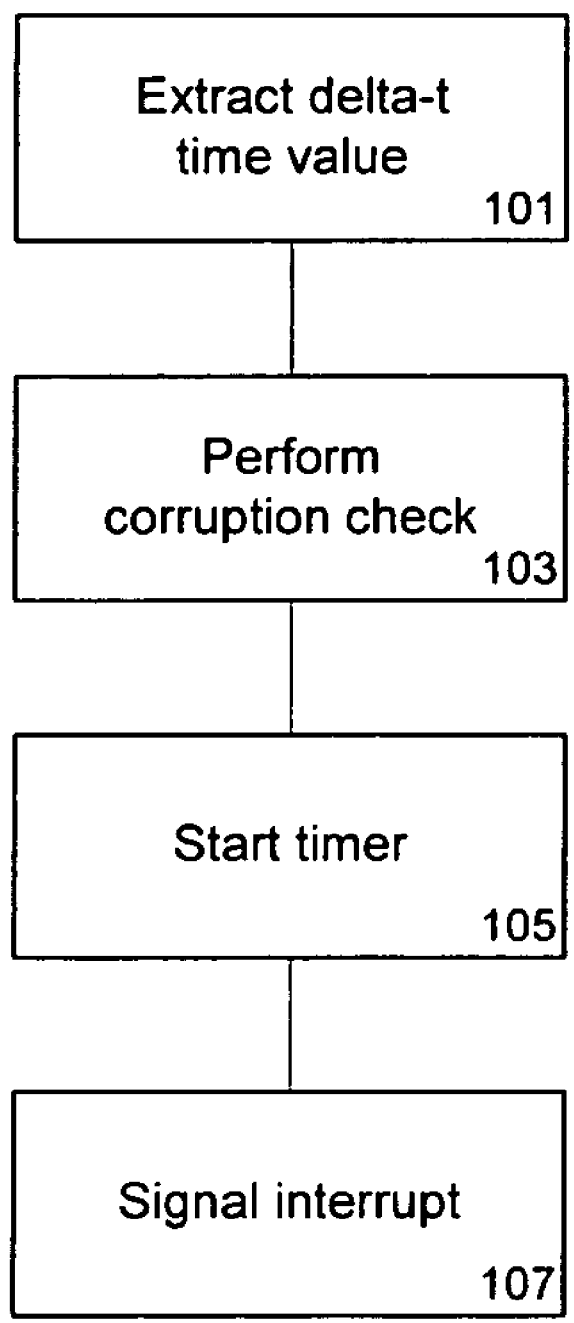
FIG. 1 shows exemplary steps involved in delta-t time value extraction operations according to various embodiments of the present invention.

With respect to FIG. 1 it is noted that, according to various embodiments of the present invention, a mobile node and/or other computer receiving a time slice burst of an elementary stream (e.g., a Terrestrial Digital Video Broadcast (DVB-T) or Digital Video Broadcasting: Handhelds (DVB-H) elementary stream) may act to extract a delta-t time value therefrom (step 101). Such an elementary stream might, for instance, be in accordance with selection by a user via a graphical user interface (GUI) and/or other interface provided by the mobile node and/or other computer. Moreover, in various embodiments the mobile node and/or other computer may provide the user with presentation (e.g., audio and/or video) corresponding to the elementary stream.

Extraction functionality may be implemented in a number of ways. For instance, the mobile node and/or other computer may act to extract the delta-t time value from a header of a packet received via the burst. The delta-t time value might, for instance, be found in one or more bytes in media access control (MAC) address bytes of a Multi-Protocol Encapsulation (MPE) section header. Extraction might, for example, involve the use of specialized hardware (e.g., a general purpose processor might not be employed). For instance, specialized decapsulation hardware (e.g., specialized Multi-Protocol Encapsulation/Internet Protocol (MPE/IP) decapsulation hardware might be employed).

It is noted that, in various embodiments, the mobile node and/or other computer may perform one or more initialization operations. For instance, the mobile node and/or other computer might act to initialize a channel to receive the elementary stream. Such initialization operations might be performed, for instance, in the case where the mobile node and/or other computer had not been previously receiving time slice bursts for the elementary stream. Such might be the case, for instance, where the mobile node and/or other computer was acting in response to a user's selection of the elementary stream. The mobile node and/or other computer might, in various embodiments, act to place the delta-t time value into a store (e.g., an internal register).

The delta-t time value might, for example, act to specify time to elapse until a subsequent time slice burst of the elementary stream. Accuracy of the delta-t time value might, for example, be +/−10 ms. It is noted that, in various embodiments, packets later received with respect to the time slice burst of the elementary stream may convey smaller delta-t time values than earlier-received packets, reflecting there being less time to elapse to the subsequent burst at the times when the later-received packets are received than the times when the earlier-received packets are received.

A timer might, in various embodiments, be started (step 105). For example start might be in response to delta-t time value extraction. Specialized hardware (e.g., specialized decapsulation hardware) might, in various embodiments, send a start signal to the timer.

Such a timer might, for instance, be a time-elapse counter. The timer might, for example, be a count-up timer. As another example, the timer might be a count-down timer. In the case where a count-up timer is employed, starting of the timer might include resetting the timer to zero.

The timer, for instance, be implemented via software. Alternately or additionally, the timer might be a specialized hardware timer. Such a specialized hardware timer might, for instance, accept a reference pulse. Accordingly, for example, the specialized hardware timer might be a 12-bit timer, and/or might have a 10 ms resolution and take in a 10 ms reference pulse. In various embodiments, specialized hardware might take in a real time clock and produce a reference pulse to feed to the specialized hardware timer. For example such specialized hardware might take in a 32678 Hz real time clock and yield a 10 ms reference pulse.

The mobile node and/or other computer might, in various embodiments act to perform a corruption check with respect to the delta-t time value (step 103). Such functionality may be implemented in a number of ways. For example, the mobile node and/or other computer may act to perform a Cyclic Redundancy Check (CRC) (e.g., for the packet corresponding to the header). For instance, CRC-32 might be performed. In various embodiments, specialized hardware (e.g., specialized decapsulation hardware) might be employed in such operation. As another example of timer start it is noted that, in various embodiments, the timer might be started in response to a performed corruption check not failing (e.g., a performed CRC check not failing).

In the case where it is determined that the delta-t time value is or might be corrupted (e.g., where a performed CRC fails), the mobile node and/or other computer might, for instance, act to wait for arrival of a new packet of the elementary stream and then perform one or more of the operations discussed above with respect to that packet (e.g., delta-t time value extraction).

Responsive to extraction of the delta-t time value and/or determination that the delta-t time value is not corrupted, an interrupt might, in various embodiments, be signaled (step 107). The interrupt might, for instance, be sent by specialized hardware (e.g., specialized decapsulation hardware) to a processor (e.g., a microcontroller). The interrupt might, for example, be interpreted as indicting that reception of a new burst has started.

Alarm Operations and Reception Circuitry Control Operations

The mobile node and/or other computer may, in various embodiments, act to set one or more alarm elapsed time values for the timer. Such operations might, for example, be performed in response to the interrupt signaled with extraction of the delta-t time value and/or determination that the delta-t time value is not corrupted.

Figure 2:
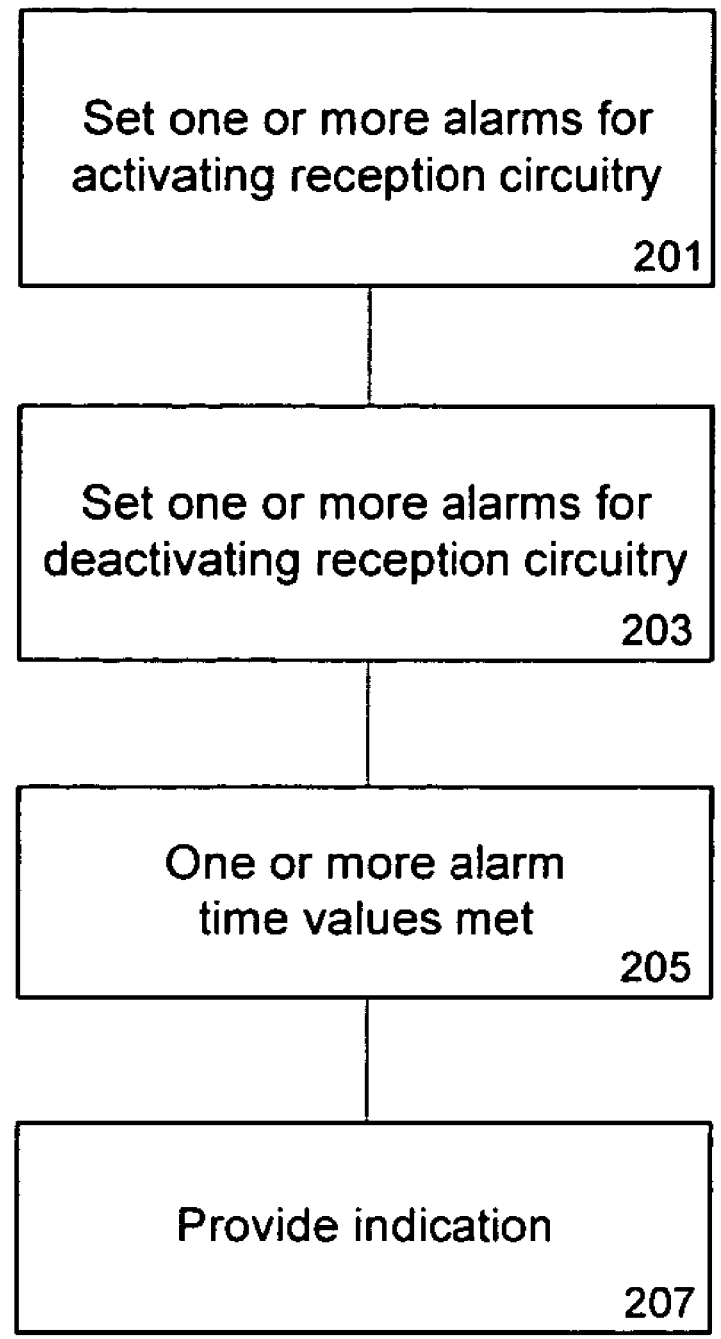
FIG. 2. shows exemplary steps involved in alarm operations and reception circuitry control operations according to various embodiments of the present invention.

With respect to FIG. 2 it is noted that, for example, one or more alarm time values for activating reception circuitry might be set (step 201). Moreover, in various embodiments one or more alarm time values for deactivating reception circuitry might be set (step 203).

Such an alarm time value for activating reception circuitry might, for example, be set to the extracted delta-t time value.

As another example, the alarm time value might be set to a value that takes into account both the extracted delta-t time value and the amount of time required to initialize the reception circuitry. The amount of time required to initialize the reception circuitry might, for instance, take into account synchronization time. Accordingly, for instance, the alarm time value might be set to the arithmetic difference between the extracted delta-t time and the amount of time required to initialize the reception circuitry. It is noted that, in various embodiments, the extracted delta-t time value may be read from a store into which it had been placed (e.g., an internal register). The alarm time value for activating reception circuitry might, for instance, be set such that the reception circuitry is activated prior to initiation of a subsequent burst.

Such an alarm time value for deactivating reception circuitry might, for example, be set to a value indicative of how long a subsequent burst of the elementary stream is to last and/or how long any given burst of the elementary stream is to last. The alarm time value for deactivating reception circuitry might, for instance, be set such that the reception circuitry is not deactivated prior to termination of a burst.

Such a value might, for instance be a maximum burst duration value for the elementary stream and/or be an obtained value (e.g., a value extracted from Service Information (SI) and/or Program Specific Information (PSI) corresponding to the elementary stream). It is noted that, in various embodiments, the mobile node and/or other computer might not act to obtain such a value, for example, in the case where it had previously received an indication regarding how long any given burst of the elementary stream is to last. The mobile node and/or other computer might, for instance, have received such an indication (e.g., a maximum burst duration value for the elementary stream) via a previous time slice burst of the elementary stream.

In various embodiments, one or more operations may be performed to make the timer aware of the one or more set alarm time values. Such functionality might be implemented in a number of ways. For example, in the case where the timer is implemented in software the alarm time values might be passed to one or more appropriate software. As another example, in the case where the timer is implemented in hardware, the one or more alarm time values might be passed to the appropriate hardware (e.g., via one or more interconnects).

It is noted that, in various embodiments, with one or more such alarm time values set, the timer, if not running already, might, perhaps in a manner analogous to that discussed above, be started. The timer might then, for instance, act to consider its value in terms of the one or more alarm time values and, in the case where one or more alarm time values were met (step 205), perform one or more operations.

For example, the timer might act to provide indication specifying which one or more alarms were met (step 207). Such indication might, for instance, be passed, perhaps in a manner analogous to that discussed above, to appropriate software and/or to appropriate hardware. Alternately or additionally, such indication might be provided, perhaps in a manner analogous to that discussed above, via a signaled interrupt (e.g., by action of a specialized hardware timer).

It is noted that, in various embodiments, no alarm time value for deactivating reception circuitry might be employed. Instead, for instance, deactivation circuitry might be deactivated responsive to determination that a burst that was being received for the elementary stream had ended. Such functionality might be implemented in a number of ways. For example, such a burst might be considered to have ended in the case where a certain amount of time had elapsed since last receipt of a packet corresponding to the elementary stream. Such an amount of time might, for instance, be extracted from service information or set by a manufacturer, user, service provider, and/or system administrator.

Figure 3:
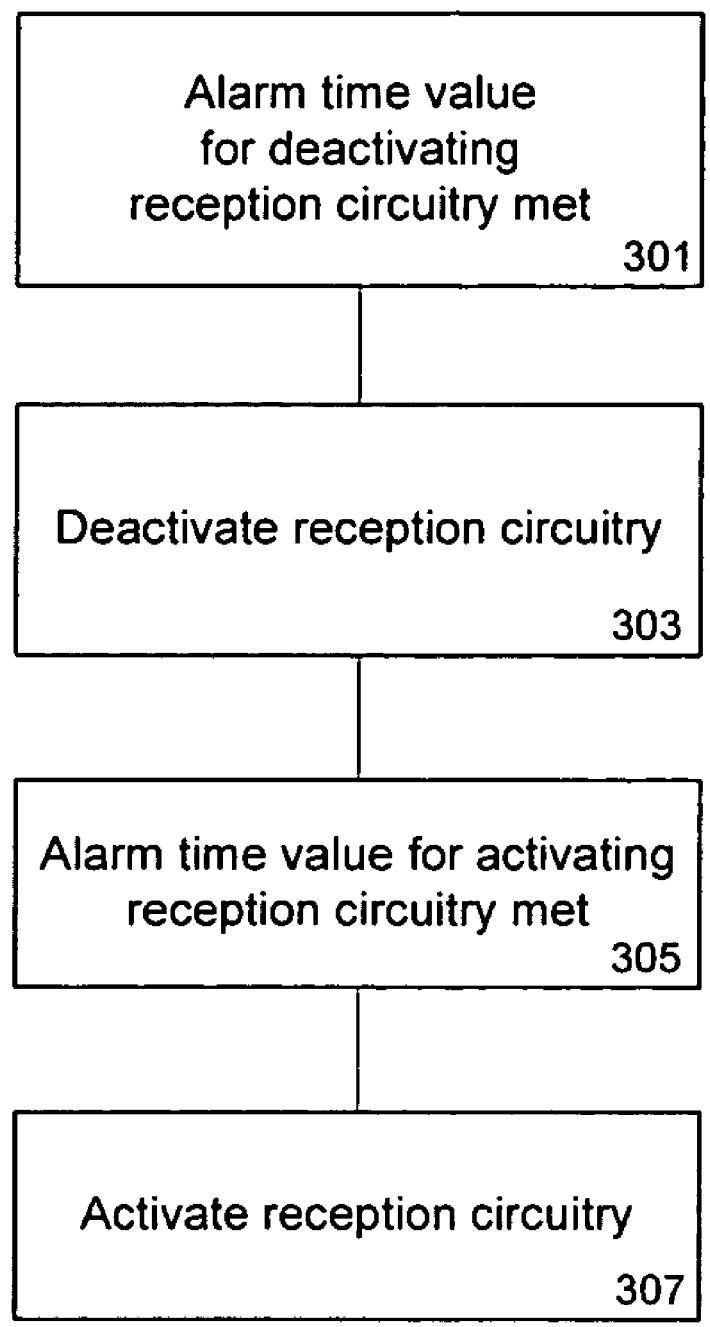
FIG. 3 shows further exemplary steps involved in alarm operations and reception circuitry control operations according to various embodiments of the present invention.

With respect to FIG. 3 it is noted that responsive to indication that one or more alarms had been met, one or more operations might, in various embodiments, be performed. For example, responsive to indication that an alarm time value for deactivating reception circuitry had been met (step 301), one or more operations to deactivate reception circuitry might be performed (step 303). For instance, appropriate signaling (e.g., Inter-Integrated Circuit (I2C) bus or Serial Peripheral Interface (SPI) bus signaling) might be provided to the reception circuitry. As alluded to above, in various embodiments such operations to deactivate reception circuitry might alternately or additionally be performed responsive to determination that a burst that was being received for the elementary stream had ended.

As another example, responsive to indication that an alarm time value for activating reception circuitry was met (step 305), one or more operations to activate reception circuitry could be performed (step 307). For instance, appropriate signaling (e.g., I2C bus or SPI bus signaling) might be provided to the reception circuitry. In various embodiments, the timer might be stopped responsive to indication that an alarm time value for activating reception circuitry was met.

With activation of the reception circuitry the mobile node and/or other computer might, for example, come to receive a subsequent time slice burst of the elementary stream. With receipt of the subsequent time slice burst the mobile node and/or other computer might, for instance, jump to receiving the subsequent time slice burst and extracting a delta-t time value from the subsequent time slice burst as discussed above with respect to delta-t time value extraction operations.

Via the above-described deactivation and/or activation of reception circuitry, the mobile node and/or other computer could, for instance, receive time slice bursts for the elementary stream such that reception circuitry would be active for reception of time slice bursts for the elementary stream, but would not be unnecessarily active otherwise. Such functionality might, for instance, lead to power savings.

It is noted that, in various embodiments, the reception circuitry might be activated before a time slice burst of the elementary stream. Such might be the case, for instance, where delta-t jitter and/or amount of time required to initialize the reception circuitry is taken into account (e.g., as discussed above). It is further noted that deactivation of reception circuitry before termination of a time slice burst of the elementary stream might, in various embodiments, be prevented (e.g., via the above described functionality for deactivation of reception circuitry).

It is additionally noted that, in various embodiments, reception circuitry might need to remain active until receipt of a first time slice burst of the elementary stream. It is noted that, in various embodiments, software running on the mobile node and/or other computer may act to select alarm time values, to make the timer aware of those values, and/or to perform operations resulting in reception circuitry activation and/or deactivation.

It is noted that, in various embodiments, MPE Forward Error Correction (MPE-FEC) might be employed. Moreover, in various embodiments, there may be non-time sliced signals. For example, time slicing might not be employed for PSI and/or SI streams, and/or there may be non-time sliced elementary streams. In various embodiments, in the case where a non-time sliced signal is received, one or more operations discussed herein might not be performed and/or various hardware discussed herein might be deactivated and/or not activated.

In various embodiments, more than one burst may be handled at a time. Moreover, in various embodiments multiple time slicing channels from different elementary streams may be handled in parallel. In various such embodiments, operations discussed herein may be performed with respect to each such burst and/or channel, and/or there may software instances and/or specialized hardware for each such burst and/or channel. For instance, there nay be a specialized hardware timer for each such burst and/or channel.

It is noted that, in various embodiments, specialized hardware discussed herein may be implemented as distinct and/or separate units (e.g., chips). For example, the specialized hardware timer, the specialized hardware taking in a real time clock and producing a reference pulse, and/or the specialized decapsulation hardware might be provided as separate units, and/or one or more units providing some or all of the specialized hardware might be provided. For example, a unit providing the timer and the decapsulation hardware might be provided.

Hardware and Software

Various operations and/or the like described herein may, in various embodiments, be implemented in hardware (e.g., via one or more integrated circuits). For instance, in various embodiments various operations and/or the like described herein may be performed by specialized hardware, and/or otherwise not by one or more general purpose processors. One or more chips and/or chipsets might, in various embodiments, be employed. In various embodiments, one or more Application-Specific Integrated Circuits (ASICs) may be employed.

Alternately or additionally, various operations and/or the like described herein may, in various embodiments, be executed by and/or with the help of computers. Further, for example, devices described herein may be and/or may incorporate computers. The phrases "computer", "general purpose computer", and the like, as used herein, refer but are not limited to a smart card, a media device, a personal computer, an engineering workstation, a PC, a Macintosh, a PDA, a portable computer, a computerized watch, a wired or wireless terminal, phone, communication device, node, and/or the like, a server, a network access point, a network multicast point, a network device, a set-top box, a personal video recorder (PVR), a game console, a portable game device, a portable audio device, a portable media device, a portable video device, a television, a digital camera, a digital camcorder, a Global Positioning System (GPS) receiver, a wireless personal sever, or the like, or any combination thereof, perhaps running an operating system such as OS X, Linux, Darwin, Windows CE, Windows XP, Windows Server 2003, Palm OS, Symbian OS, or the like, perhaps employing the Series 40 Platform, Series 60 Platform, Series 80 Platform, and/or Series 90 Platform, and perhaps having support for Java and/or .Net.

Figure 4:
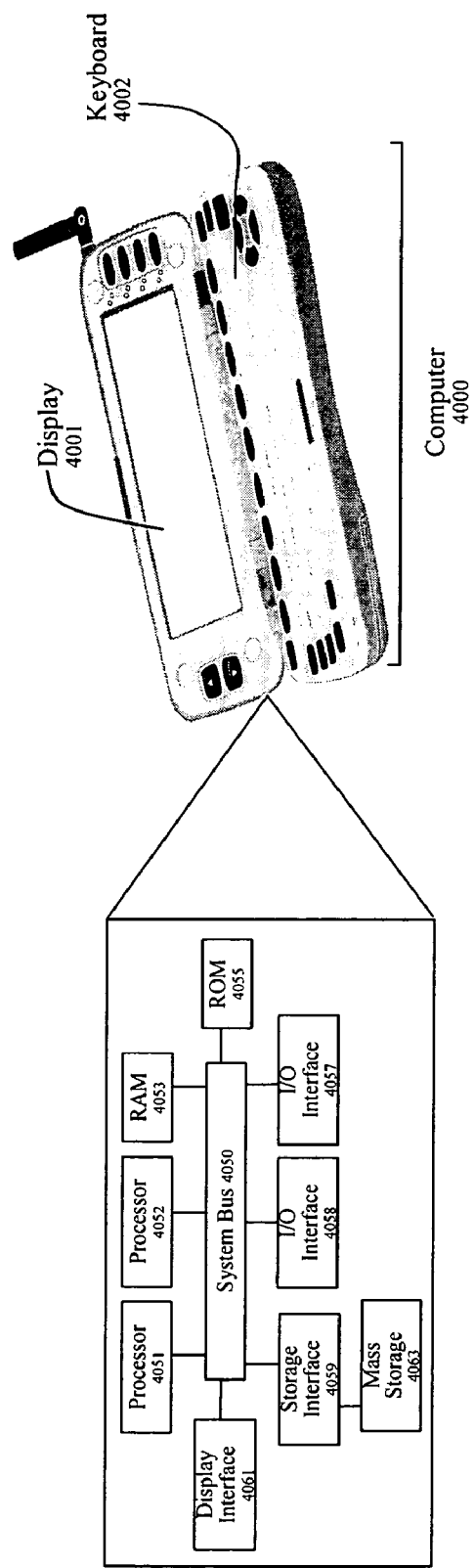
FIG. 4 shows an exemplary computer.

The phrases "general purpose computer", "computer", and the like also refer, but are not limited to, one or more processors operatively connected to one or more memory or storage units, wherein the memory or storage may contain data, algorithms, and/or program code, and the processor or processors may execute the program code and/or manipulate the program code, data, and/or algorithms. Shown in FIG. 4 is an exemplary computer employable in various embodiments of the present invention. Exemplary computer 4000 includes system bus 4050 which operatively connects two processors

4051 and 4052, random access memory 4053, read-only memory 4055, input output (I/O) interfaces 4057 and 4058, storage interface 4059, and display interface 4061. Storage interface 4059 in turn connects to mass storage 4063. Each of I/O interfaces 4057 and 4058 may, for example, be an Ethernet, IEEE 1394, IEEE 1394b, IEEE 802.11a, IEEE 802.11b, IEEE 802.11g, IEEE 802.11i, IEEE 802.11e, IEEE 802.11n, IEEE 802.15a, IEEE 802.16a, IEEE 802.16d, IEEE 802.16e, IEEE 802.16×, IEEE 802.20, IEEE 802.15.3, ZigBee, Bluetooth, Ultra Wide Band (UWB), Wireless Universal Serial Bus (WUSB), wireless Firewire, terrestrial digital video broadcast (DVB-T), satellite digital video broadcast (DVB-S), Advanced Television Systems Committee (ATSC), Integrated Services Digital Broadcasting (ISDB), Digital Multimedia Broadcast-Terrestrial (DMB-T), Terrestrial Digital Multimedia Broadcasting (T-DMB), Digital Audio Broadcast (DAB), Digital Radio Mondiale (DRM), General Packet Radio Service (GPRS), Universal Mobile Telecommunications Service (UMTS), Global System for Mobile Communications (GSM), DVB-H (Digital Video Broadcasting: Handhelds), IrDA (Infrared Data Association), and/or other interface.

Mass storage 4063 may be a hard drive, optical drive, a memory chip, or the like. Processors 4051 and 4052 may each be a commonly known processor such as an IBM or Freescale PowerPC, an AMD Athlon, an AMD Opteron, an Intel ARM, an Intel XScale, a Transmeta Crusoe, a Transmeta Efficeon, an Intel Xenon, an Intel Itanium, an Intel Pentium, or an IBM, Toshiba, or Sony Cell processor. Computer 4000 as shown in this example also includes a touch screen 4001 and a keyboard 4002. In various embodiments, a mouse, keypad, and/or interface might alternately or additionally be employed. Computer 4000 may additionally include or be attached to card readers, DVD drives, floppy disk drives, hard drives, memory cards, ROM, and/or the like whereby media containing program code (e.g., for performing various operations and/or the like described herein) may be inserted for the purpose of loading the code onto the computer.

In accordance with various embodiments of the present invention, a computer may run one or more software modules designed to perform one or more of the above-described operations. Such modules might, for example, be programmed using languages such as Java, Objective C, C, C#, C++, Perl, Python, and/or Comega according to methods known in the art. Corresponding program code might be placed on media such as, for example, DVD, CD-ROM, memory card, and/or floppy disk. It is noted that any described division of operations among particular software modules is for purposes of illustration, and that alternate divisions of operation may be employed. Accordingly, any operations discussed as being performed by one software module might instead be performed by a plurality of software modules. Similarly, any operations discussed as being performed by a plurality of modules might instead be performed by a single module. It is noted that operations disclosed as being performed by a particular computer might instead be performed by a plurality of computers. It is further noted that, in various embodiments, peer-to-peer and/or grid computing techniques may be employed.

Figure 5:
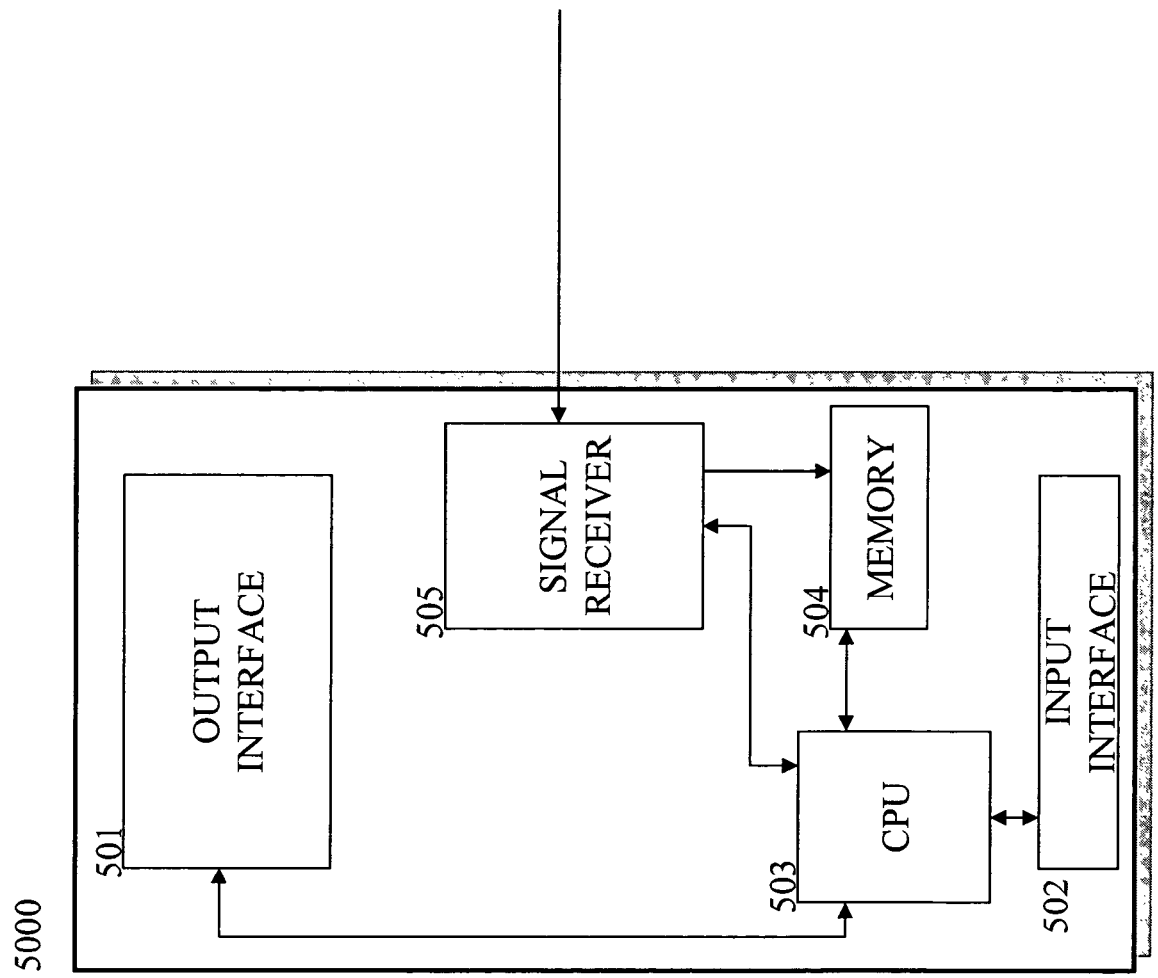
FIG. 5 shows a further exemplary computer.

Shown in FIG. 5 is a block diagram of a terminal, an exemplary computer employable in various embodiments of the present invention. In the following, corresponding reference signs are applied to corresponding parts. Exemplary terminal 5000 of FIG. 5 comprises a processing unit CPU 503, a signal receiver 505, and a user interface (501, 502). Signal receiver 505 may, for example, be a single-carrier or multi-carrier receiver. Signal receiver 505 and the user interface (501, 502) are coupled with the processing unit CPU 503. One or more direct memory access (DMA) channels may exist between multi-carrier signal terminal part 505 and memory 504. The user interface (501, 502) comprises a display and a keyboard to enable a user to use the terminal 5000. In addition, the user interface (501, 502) comprises a microphone and a speaker for receiving and producing audio signals. The user interface (501, 502) may also comprise voice recognition (not shown).

The processing unit CPU 503 comprises a microprocessor (not shown), memory 504 and possibly software. The software can be stored in the memory 504. The microprocessor controls, on the basis of the software, the operation of the terminal 5000, such as receiving of a data stream, tolerance of the impulse burst noise in data reception, displaying output in the user interface and the reading of inputs received from the user interface. The hardware contains circuitry for detecting signal, circuitry for demodulation, circuitry for detecting impulse, circuitry for blanking those samples of the symbol where significant amount of impulse noise is present, circuitry for calculating estimates, and circuitry for performing the corrections of the corrupted data.

Still referring to FIG. 5, alternatively, middleware or software implementation can be applied. The terminal 5000 can, for instance, be a hand-held device which a user can comfortably carry. The terminal 5000 can, for example, be a cellular mobile phone which comprises the multi-carrier signal terminal part 505 for receiving multicast transmission streams. Therefore, the terminal 5000 may possibly interact with the service providers.

Figure 6:
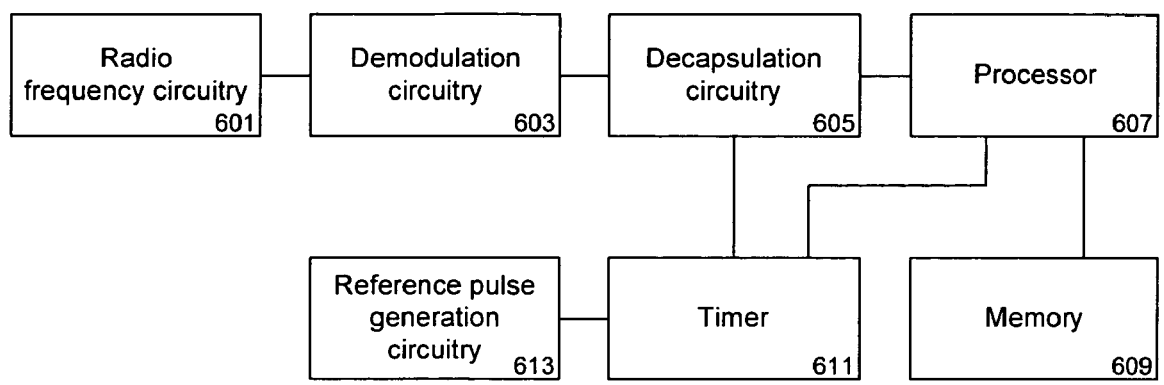
FIG. 6 shows exemplary hardware according to various embodiments of the present invention

Shown in FIG. 6 is exemplary hardware according to various embodiments of the present invention. Included in FIG. 6 are circuitry that receives a radio frequency (RF) signal and produces a baseband signal (e.g., via direct conversion method) 601, demodulation circuitry (e.g., DVB-H demodulation circuitry) 603, decapsulation circuitry (e.g., the above-discussed specialized decapsulation hardware) 605, processor (e.g., a microcontroller) 607, memory 609, timer (e.g., the above-discussed specialized hardware timer) 611, and reference pulse generation circuitry (e.g., the above-discussed specialized hardware taking in a real time clock and producing a reference pulse) 613.

It is noted that, in various embodiments, the mobile node and/or other computer may be implemented as a terminal portion and a receiver portion. The receiver portion and the terminal portion might, for example, be implemented as a single device. For instance, the receiver portion and the terminal portion may share a housing, may coexist on one or more circuit boards, and/or may coexist in one or more units (e.g., chips). As another example, the receiver portion and the terminal portion may be implemented as separate devices. Communication between the receiver portion and the terminal portion may, in various embodiments, involve I2C bus, Universal Serial Bus (USB), and/or Serial Peripheral Interface (SPI).

In various embodiments, the terminal portion might, for example, receive indication (e.g., of a desired service, a desired elementary stream, and/or desired content) from a user (e.g., via a GUI and/or other interface that it provides), and/or might pass appropriate information to the receiver portion to allow the receiver portion to perform, for instance, various operations for receipt (e.g., operations including taking in a radio frequency signal and yielding data such as IP packets and/or other packets). Further, the terminal portion might, for example, act to provide presentation to its user (e.g., of an elementary stream). It is noted that, in various embodiments, there may be no receiver component, and the mobile node and/or other computer may, for example, perform receiver component operations.

RAMIFICATIONS AND SCOPE

Although the description above contains many specifics, these are merely provided to illustrate the invention and should not be construed as limitations of the invention's scope. Thus it will be apparent to those skilled in the art that various modifications and variations can be made in the system and processes of the present invention without departing from the spirit or scope of the invention.

In addition, the embodiments, features, methods, systems, and details of the invention that are described above in the application may be combined separately or in any combination to create or describe new embodiments of the invention.

What is claimed is:

1. A method, comprising:
   receiving a first time slice burst of an elementary stream;
   setting an alarm elapsed time value for a time elapse counter, wherein the alarm elapsed time value takes into account a delta-t time value and a reception circuitry initialization time, wherein the delta-t time value is extracted from a section header in the first time slice burst, and wherein the delta-t time value specifies time to elapse until a subsequent time slice burst of the elementary stream;
   deactivating reception circuitry, wherein deactivation is not prior to termination of the first time slice burst;
   activating the reception circuitry responsive to the alarm elapsed time value being met, wherein the reception circuitry is activated prior to initiation of the subsequent time slice burst of the elementary stream; and
   receiving the subsequent time slice burst of the elementary stream,
   wherein the delta-t time value is extracted from media access control address bytes in the section header,
   wherein multiple time slice channels are handled in parallel, and
   wherein digital video broadcasting for handhelds is employed.

2. The method of claim 1, wherein the time elapse counter is a specialized hardware timer.

3. The method of claim 1, wherein the delta-t time value is determined to not be corrupted.

4. The method of claim 1, wherein the delta-t time value is stored in an internal register.

5. The method of claim 1, wherein an interrupt is provided responsive to extraction of the delta-t time value.

6. The method of claim 1, wherein an interrupt is provided responsive to the alarm elapsed time value being met.

7. The method of claim 1, wherein channel initialization is performed.

8. A method, comprising:
   setting a first alarm elapsed time value for a time elapse counter, wherein the first alarm elapsed time value takes into account a delta-t time value extracted from a section header in a first time slice burst of an elementary stream, and wherein the delta-t time value specifies time to elapse until a subsequent time slice burst of the elementary stream;
   setting a second alarm elapsed time value for the time elapse counter, wherein the second alarm elapsed time value takes into account a maximum burst duration value for the elementary stream, wherein the maximum burst duration value is extracted from service information for the elementary stream;
   deactivating reception circuitry responsive to the second alarm elapsed time value being met; and
   activating the reception circuitry responsive to the first alarm elapsed time value being met,
   wherein the delta-t time value is extracted from media access control address bytes in the section header,
   wherein multiple time slice channels are handled in parallel, and
   wherein digital video broadcasting for handhelds is employed.

9. The method of claim 8, wherein the time elapse counter is a specialized hardware timer.

10. The method of claim 8, wherein the delta-t time value is determined to not be corrupted.

11. The method of claim 8, wherein the delta-t time value is stored in an internal register.

12. The method of claim 8, wherein an interrupt is provided responsive to extraction of the delta-t time value.

13. The method of claim 8, wherein an interrupt is provided responsive to an alarm elapsed time value being met.

14. The method of claim 8, wherein channel initialization is performed.

15. A system, comprising:
   a memory having program code stored therein; and
   a processor disposed in communication with the memory for carrying out instructions in accordance with the stored program code;
   wherein the program code, when executed by the processor, causes the processor to perform:
   receiving a first time slice burst of an elementary stream;
   setting an alarm elapsed time value for a time elapse counter, wherein the alarm elapsed time value takes into account a delta-t time value and a reception circuitry initialization time, wherein the delta-t time value is extracted from a section header in the first time slice burst, and wherein the delta-t time value specifies time to elapse until a subsequent time slice burst of the elementary stream;
   deactivating reception circuitry, wherein deactivation is not prior to termination of the first time slice burst;
   activating the reception circuitry responsive to the alarm elapsed time value being met, wherein the reception circuitry is activated prior to initiation of the subsequent time slice burst of the elementary stream; and
   receiving the subsequent time slice burst of the elementary stream,
   wherein the delta-t time value is extracted from media access control address bytes in the section header,
   wherein multiple time slice channels are handled in parallel, and
   wherein digital video broadcasting for handhelds is employed.

16. The system of claim 15, wherein the time elapse counter is a specialized hardware timer.

17. The system of claim 15, wherein the delta-t time value is determined to not be corrupted.

18. The system of claim 15, wherein the delta-t time value is stored in an internal register.

19. The system of claim 15, wherein an interrupt is provided responsive to extraction of the delta-t time value.

20. The system of claim 15, wherein an interrupt is provided responsive to the alarm elapsed time value being met.

21. The system of claim 15, wherein channel initialization is performed.

22. A system, comprising:
   a memory having program code stored therein; and a processor disposed in communication with the memory for carrying out instructions in accordance with the stored program code;

wherein the program code, when executed by the processor, causes the processor to perform:

setting a first alarm elapsed time value for a time elapse counter, wherein the first alarm elapsed time value takes into account a delta-t time value extracted from a section header in a first time slice burst of an elementary stream, and wherein the delta-t time value specifies time to elapse until a subsequent time slice burst of the elementary stream;

setting a second alarm elapsed time value for the time elapse counter, wherein the second alarm elapsed time value takes into account a maximum burst duration value for the elementary stream, wherein the maximum burst duration value is extracted from service information for the elementary stream;

deactivating reception circuitry responsive to the second alarm elapsed time value being met; and activating the reception circuitry responsive to the first alarm elapsed time value being met, wherein the delta-t time value is extracted from media access control address bytes in the section header, wherein multiple time slice channels are handled in parallel, and wherein digital video broadcasting for handhelds is employed.

23. The system of claim 22, wherein the time elapse counter is a specialized hardware timer.

24. The system of claim 22, wherein the delta-t time value is determined to not be corrupted.

25. The system of claim 22, wherein the delta-t time value is stored in an internal register.

26. The system of claim 22, wherein an interrupt is provided responsive to extraction of the delta-t time value.

27. The system of claim 22, wherein an interrupt is provided responsive to an alarm elapsed time value being met.

28. The system of claim 22, wherein channel initialization is performed.

29. At least one integrated circuit, comprising:

chip circuitry configured to perform:

receiving a first time slice burst of an elementary stream;

setting an alarm elapsed time value for a time elapse counter, wherein the alarm elapsed time value takes into account a delta-t time value and a reception circuitry initialization time, wherein the delta-t time value is extracted from a section header in the first time slice burst, and wherein the delta-t time value specifies time to elapse until a subsequent time slice burst of the elementary stream;

deactivating reception circuitry, wherein deactivation is not prior to termination of the first time slice burst;

activating the reception circuitry responsive to the alarm elapsed time value being met, wherein the reception circuitry is activated prior to initiation of the subsequent time slice burst of the elementary stream; and receiving the subsequent time slice burst of the elementary stream, wherein the delta-t time value is extracted from media access control address bytes in the section header, wherein multiple time slice channels are handled in parallel, and wherein digital video broadcasting for handhelds is employed.

30. At least one integrated circuit, comprising:

chip circuitry configured to perform:

setting a first alarm elapsed time value for a time elapse counter, wherein the first alarm elapsed time value takes into account a delta-t time value extracted from a section header in a first time slice burst of an elementary stream, and wherein the delta-t time value specifies time to elapse until a subsequent time slice burst of the elementary stream;

setting a second alarm elapsed time value for the time elapse counter, wherein the second alarm elapsed time value takes into account a maximum burst duration value for the elementary stream, wherein the maximum burst duration value is extracted from service information for the elementary stream;

deactivating reception circuitry responsive to the second alarm elapsed time value being met; and activating the reception circuitry responsive to the first alarm elapsed time value being met, wherein the delta-t time value is extracted from media access control address bytes in the section header, wherein multiple time slice channels are handled in parallel, and wherein digital video broadcasting for handhelds is employed.

* * * * *